US006251523B1

(12) United States Patent
Takahashi et al.

(10) Patent No.: US 6,251,523 B1
(45) Date of Patent: Jun. 26, 2001

(54) REFLECTION PREVENTING GLASS PLATE AND PRODUCTION METHOD THEREOF AND COATING COMPOSITION FOR REFLECTION PREVENTING

(75) Inventors: Kouji Takahashi; Hideki Okamoto, both of Osaka-fu (JP)

(73) Assignee: Nippon Sheet Glass Co, Ltd., Osaka-fu (JP)

( * ) Notice: Subject to any disclaimer, the term of this patent is extended or adjusted under 35 U.S.C. 154(b) by 0 days.

(21) Appl. No.: 09/329,427

(22) Filed: Jun. 10, 1999

Related U.S. Application Data

(63) Continuation of application No. PCT/JP98/05557, filed on Dec. 8, 1998.

(30) Foreign Application Priority Data

Dec. 19, 1997 (JP) .................................. 97-338363

(51) Int. Cl.⁷ .................................... B32B 17/06
(52) U.S. Cl. .......................... 428/428; 428/429
(58) Field of Search .................... 428/428, 429, 428/432, 402

(56) References Cited

U.S. PATENT DOCUMENTS

| | | | |
|---|---|---|---|
| 4,374,158 | * | 2/1983 | Taniguchi et al. . |
| 4,927,668 | * | 5/1990 | Senckowski . |
| 5,116,644 | * | 5/1992 | Asai et al. . |
| 5,165,992 | * | 11/1992 | Yajima et al. . |

OTHER PUBLICATIONS

PCT International Search Report (PCT/ISA/210—Jul. 1998) for I.A. No. PCT/JP98/05557, I.A. Filing Date: Dec. 8, 1998; Priority Date: Dec. 9, 1997.
Abstract of Japanese Patent Application No. 8–122501 (May 17, 1996).
Abstract of Japanese Patent Application No. 1–317115 (Dec. 21, 1989).
Abstract of Japanese Patent Application No. 7–118008 (May 9, 1995).

* cited by examiner

*Primary Examiner*—Deborah Jones
*Assistant Examiner*—Jennifer McNeil
(74) *Attorney, Agent, or Firm*—Dike, Bronstein, Roberts & Cushman IP Group; Edwards & Angell, LLP; David G. Conlin

(57) ABSTRACT

There is provided a glass plate suitable for windows of automobile which shows small reflectivity at high incident angle and gives improved visibility.

A film comprising the chain silica fine particles and silica of 5 to 30% by weight based on the weight of said chain silica fine particles and having a thickness of 110 to 250 nm is coated on at least one of the glass substrate surfaces, and dents and projections are formed on the surface of said film, by which a glass plate for an automobile which shows small reflectivity at high incident angle is provided.

8 Claims, No Drawings

REFLECTION PREVENTING GLASS PLATE AND PRODUCTION METHOD THEREOF AND COATING COMPOSITION FOR REFLECTION PREVENTING

This is a continuation application based upon International Application PCT/JP98/05557, with an international filing date of Dec. 8, 1998, which in turn claimed priority from Japanese Application No. H9 (97)-338363, filed Dec. 8, 1997.

FIELD OF THE ART

The present invention relates to a reflection prevention glass plate, especially a glass plate suitable for use as windows of an automobile having small visible light reflectivity, and to a method for producing the same. The invention also relates to coating compositions for forming a reflection preventing film.

BACKGROUND ART

Conventionally, provision of reflection preventive treatment on the surface of the glass product has been practiced to prevent loss of fluoroscopic property and light permeability or dazzling due to the reflection of visible light on the surface of a glass plate or other glass product.

There is known, for example, a low refractive index reflection preventive film made by coating a coating liquid comprising a silica sol having a particle size of 5 to 30 nm and a hydrolyzate of alkoxy silane contained in the solvent and cured (Japanese Patent Laid-open Publication No. H8-122501).

In the front glass of an automobile, there is a problem of lowering a driver's visibility of front area by reflection images of inner panel (instrument panel) inside a car and dash board coming into driver's view. This problem is due to the reflection of the light incident from the inner panel and dash board and surroundings thereof upon the surface of the front window glass. The light incident from inner panel and dash board income with quite a high incident angle upon the front window glass and get into the driver's eyes. In order to improve the visibility, reflectivity upon the front window glass at the high incident angle (60° for example) is required to be lowered. With the above low refractive index reflection preventive film it is still insufficient to realize reduction of reflectivity at high incident angle, and it cannot be commented that the visibility is sufficiently high.

An object of the present invention is to provide a glass plate suitable for windows of an automobile having small reflectivity of visible light at high incident angle and improved visibility.

DISCLOSURE OF THE INVENTION

The present invention provides a glass plate for visible light reflection prevention with the film comprising chain silica fine particles and silica of 5 to 30% by weight based on the weight of said chain silica fine particles, and having thickness of 110 to 250 nm coated on at least one surface of the glass substrate, and dents and projections being formed on the surface of the film.

Further, the present invention provides a glass plate for visible light reflection prevention having small reflectivity at high incident angle, with the film comprising chain silica fine particles and silica, and having thickness of 110 to 250 nm coated on at least one of surface the glass substrate, space being formed between the mutually adjacent chain silica fine particles in the film, said film having refractive index of 1.25 to 1.40, and dents and projections being formed on the surface of the film.

In the present invention, the glass substrate surface is coated with a reflection preventive film comprising the chain silica fine particles and silica, and the film surface is provided with dents and projections caused by the projection of chain silica fine particles.

The above film comprises the chain silica fine particles and a smaller amount of silica, preferably 5 to 30% by weight of silica based on the weight of the chain silica fine particles which does not have the form of fine particles, wherein the silica serves as a binder for mutual adhesion between the chain silica fine particles and adhesion between the silica fine particles and the glass substrate surface.

As to the above mentioned chain silica fine particles, straight linear shaped ones may be used, but two-dimensionally, more preferably three-dimensionally curved shaped ones are most preferably used. By using the chain shaped silica fine particles, there are formed a large number of gaps of 5 to 20 nm width between the adjacent chain fine particles in the film. These large numbers of gaps have exceedingly large gross volume in comparison with the gaps made on supposition of using the same amount of spherical silica fine particles in place of the chain silica fine particles. Moreover, because the amount of silica used as binder for adhering the chain fine particles one another is small, the above gaps are not filled by the silica binder, and a majority of the gaps remain as voids occupied by air or gas. Due to the existence of such voids, the refractive index value of the film as a whole becomes smaller than the refractive index of silica (about 1.45) to become 1.25 to 1.40. The refractive index of the film at which reflective prevention theoretically becomes zero is the square root value of the refractive index of the glass substrate (1.50), i.e. 1.225, and the refractive index of the present invention can get closer to this index.

When the amount of silica as a binder in the film is too scarce, if it is less than 5% by weight to that of chain silica fine particles for example, the adhesion of the chain silica fine particles becomes insufficient to cause lowering of the mechanical strength of the film. Inversely, when the amount of silica is too large, if it is more than 30% by weight to that of chain silica fine particles for example, the gaps between the chain fine particles are fully filled by the silica to leave no void, so that the refractivity of the film cannot be made small, and the reflectivity cannot be lowered. The volume of the above-mentioned voids is between 50 to 80% of the volume of the entire film when the refractive index of the latter film is compared to the refractive index of a film made of silica without voids (about 1.45).

On the film surface, there are formed small dents and projections mainly by the projection surface of the chain silica fine particles, which serve to prevent reflection images by diffusing the reflection lights, and not to lower the resolution of the penetration images. When the amount of silica as the binder in the film is too large, the whole chain silica fine particles submerge under the silica. Because of this, the arithmetic mean roughness (Ra) of the film surface to be described later becomes less than 5 nm, and the mean interval (Sm) of the dents and projections on the film surface is apt to exceed 300 nm, and it becomes impossible to prevent practical reflection of the reflective images. Accordingly, for the purpose of lowering the refractive index of the film without lowering mechanical strength of the film, and moreover, to form the above mentioned dents and projections on the film surface, the amount of silica in the film is preferably made to 5 to 30% by weight, more preferably to 10 to 20% by weight, based on the weight of the chain silica fine particles.

The size of the chain silica fine particles is preferably of an average diameter of 10 to 20 nm and an average length of 60 to 200 nm. Herein, the average diameter means a value obtained by measuring each diameter of 100 samples with electron microscope, and the weights are given to the measured values in proportion to the volume. Similarly, the average length means that the respective lengths of 100 samples (in case of the sample being curved, the length taken along the curve) are measured with electron microscope, and the weights are given to the measured values in proportion to the volume and the average values are obtained.

When the average diameter is less than 10 nm or the average length is less than 60 nm, (1) the total volume of the voids between the adjacent fine particles becomes and accordingly that of the voids of the total volume becomes small, so that it becomes impossible to make the value of refractive index as a film small. Also, (2) the arithmetic mean roughness (Ra) of the resulting film surface becomes less than 5 nm, whereby it becomes impossible to form enough of the effective dents and projections to prevent the interference of the reflection images and undesirable. In case of the average diameter exceeding 20 nm or the average length exceeding 200 nm, the arithmetic mean roughness (Ra) of the film surface becomes 50 nm or more by which there arise tendencies for haze to occur or the resolution of the penetration images to become low, resulting in lowering of visibility. This is not desirable.

Here, the arithmetic mean roughness (Ra) and the mean of interval of dents and projections (Sm) can be measured by the method which expand the two-dimensionally defined by Japanese Industrial Standards, (JIS) B 0601(1994) into three-dimensionally definition by using an atomic force microscope (ARM) (Scanning type probe electron microscope SPI3700 made by SEIKO Electronic Co., detecting lever: SI-DF20 made by silicon). In this case, measured area of the sample is square of the size of 1 $\mu$m×1 $\mu$m, the number of the measured points are 512×256 points, the scanning rate is 1.02 Hz, the shape of the surface is measured in DMF (cyclic contact mode) and the value is amended by low path filter and leveling amendment of measured data (curved surface is obtained by approximate least-squares method, treated by fitting method, the slope of the data is amended and distortion along Z axis is deleted.) As a result, the surface roughness of Ra and the rate Sm were obtained.

It can be calculated by the observation using electron microscope (H-600 made by Hitachi, Ltd., for example) besides an atomic force microscope, and by the measurement of the cross section curve.

When the surface of the glass plate is covered with the film comprising the smaller amount of reflectivity (n) and the thickness (d) than that of glass substrate, the conditions where the reflectivity becomes the minimum angle is shown in the following equation, where n is a refractive index of film, $\lambda$ is a wavelength of light, $\alpha$ is an incident angle, m is 0 or a positive integral.

$$d(n^2-\sin^2 \alpha)^{1/2}=\lambda(1+2m)/4 \quad \text{Equation (1)}$$

The minimum film thickness (d) of the visible light reflection rate at the high incident angle, 60 degrees for example, is shown in the following equation 2 which is obtained by substituting $\alpha=60$, m=0 into the above equation 1. In equation 2, the film of refractive index n can minimize the reflectivity of the light of a wavelength to the smallest if it satisfies the film thickness (d) of the following equation at any wave length in the range of the visible light (380–780 nm). If m is substituted for 1, 2 or more, it is not preferable because absorption of visible light increase for thickness of the film becoming very large. From equation 2, the thickness of the film when visible light reflective index become minimum is the range of 86–216 nm, because the reflective index of the film composing the chain silica fine particles and silica based on the present invention is the range between 1.25–1.40 as above mentioned. However, the thickness of the film based on the present invention is defined a height between the surface of the glass plate and the top of the projection of the film which surface has dents and projections. Therefore, it is preferable that the actual thickness of the present invention is the range between 110–250 nm because the thickness of the film of the present invention enlarges to almost the same extent as the arithmetic mean roughness (Ra) of the surface of the film compared to that of following equation.

$$d=(\lambda/4)\times(n^2-\tfrac{3}{4})^{-1/2} \quad \text{Equation (2)}$$

The film which is made of the chain silica fine particle and the silica is formed on one side or both sides of the surface of the glass substrate. When the both sides of the glass plate are used against the medium which reflective index is nearly 1 as the air or the gas, there are obtained higher reflective prevention effect when this film is formed on both sides of the glass substrate. However, when one side of the surface of the glass substrate is used against the medium which reflective index of the glass substrate is closer, in the case when two glass slates are attached using transparent resin film like polyvinylbutylal for example, visible light reflection at boundary area between the glass plate and transparent resin film can be ignored. As a result of this, it is enough only to form the film made of the chain silica fine particle and the silica on the outside surfaces of each glass plate and not to form on the surface of the glass plate which is against transparent resin film.

The chain silica fine particles are preferably used in the form of sol dispersed in solvent. Examples of the chain silica fine particle sol are, for example, "Snowtex-OUP", "Snowtex-UP" made by Nissan Chemical Industry Co., Ltd. These products have the average diameter of 10 to 20 nm and the average length of 60 to 200 nm, with the three dimensionally curved configuration.

The above solvent of fine particles is not specifically limited, if the fine particles are substantially dispersed in stable state. Preferred solvents are water, methanol, ethanol, propanol, ethyl cellosolve, butyl cellosolve, propyl cellosolve, etc. solely or in mixed state, more preferably water and propyl cellosolve. These water and lower alcohol are favorably used because they are simply mixed with the solution containing the organometallic compounds, and can be simply removed by heat treatment after film formation. Of these compounds, water and propyl cellosolve are most preferable in view of the production environment.

In the present invention, the coating of the silica film having dents and projections surface on a glass substrate is carried out by applying a liquid containing, for example, chain silica fine particles and at least one silicon compound selected from the group consisting of a hydrolyzable and condensation polymerizable organic silicon compound, chlorosilyl group containing silicon compound, and their hydrolyzates, to a glass substrate surface.

In adding the above fine particles to the solution containing hydrolyzable and condensation polymerizable organic silicon compound, chlorosilyl group containing silicon compound, a dispersion auxiliary may be added. The dispersion auxiliary is not specifically limited but generally used additives, e.g., electrolyte such as sodium phosphate, sodium hexamethaphosphate, potassium pyrophosphate, aluminum chloride, iron chloride, various surface-active agents, various organic polymers, silane coupling agents, titanium coupling agents, etc. can be used. Their addition amounts are ordinarily 0.01 to 5% by weight based on the above colloids or fine particles.

The organic silicon compound which can be hydrolyzed and condensation polymerized that is to be contained in the liquid together with the above silica fine particles may be basically any compound which can be subjected to hydrolysis and dehydration condensation, of which preferable ones are silicon alkoxide and silicon chelate.

As the silicon alkoxide, concretely there are preferably used silicon methoxide, ethoxide, propoxide, buthoxide, etc. solely or in mixed form. As the silicon chelate, acetyl acetonate complex of silicon is preferably used.

Also, as the above organic silicon compound, there can be used a macromolecular weight type alkyl silicate, e.g., "ethyl silicate 40" made by Colcoat K.K., "MS56" made by Misubishi Chemical Co., Ltd. and the like.

As the above organic silicon compound hydrolyzate, there can be used commercialized alkoxy silane hydrolyzed liquid, e.g., "HAS-10" made by Colcoat K.K., "CERAMICA G-91", "G-92–6" made by K.K. Nichihan Kenkyusho, "ATRON NSI-500" made by Nippon Soda Co., Ltd., etc.

The chlorosilyl group containing compound to be incorporated in the liquid together with the above chain silica fine particles is a compound having at least one chlorosilyl group ($—SiCl_nX_{3-n}$, wherein n is 1, 2 or 3, X is hydrogen, or alkyl, alkoxy, or acyloxy group having respectively 1 to 10 carbon atoms) in a molecule, of which the compound having at least two chlorine is preferred. Preferred ones are chlorosilane in which at least two hydrogens of the silane $Si_nH_{2n+2}$ (wherein n is an integer of 1 to 5) are substituted by chlorine, and other hydrogen is substituted by the above alkyl, alkoxy, or acyloxy group as necessary, and their condensation polymerization products, which can be given, for example, as tetrachlorosilane (silicon tetrachloride, $SiCl_4$), trichlorosilane ($SiHCl_3$), trichloromonomethyl silane ($SiCH_3Cl_3$), dichlorosilane ($SiH_2Cl_2$), and $Cl—(SiCl_2O)n-SiCl_3$ (wherein n is an integer of 1 to 10) etc. The hydrolyzates of the above chlorosilyl group-containing compounds may be used, of which the sole or plural compounds may be used in combination. The most preferable chlorosilyl group-containing compound is tetrachlorosilane. The chlorosilyl group has very high reactivity, and by self-condensation or by condensation reaction with the substrate surface, it shows strong adhesive force.

The solvent of the solution which disperses the above chain silica fine particles and containing the above organic silicon compound or chlorosilyl group containing compound, or their hydrolyzates may be any one insofar as it substantially dissolves the above organic silicon compound or its hydrolyzates. The most preferable ones are alcohols such as methanol, ethanol, propanol, butanol, etc., ethyl cellosolve, butyl cellosolve, and propyl cellosolve. When the concentration of the above organic silicon compound is too high, though the amount of the chain silica fine particles to be dispersed may have relations, it becomes impossible to provide sufficient voids between the above fine particles in the film, so the amount is preferably 20% or less by weight. The concentration of 1 to 20% by weight is preferable. And, the amount of the above organic silicon compound or chlorosilyl group-containing compound to the amount of the chain silica fine particles in the solution, or the amount of their hydrolyzates (total) is preferably 5 to 30% by weight based on 100% by weight of the chain silica fine particles converted into silica.

For the hydrolysis of the above organic silicon compound, water is necessary. This can be any of acidic and neutral, but in order to accelerate hydrolysis, preferably there is used water converted into acidic with hydrochloric acid, nitric acid, sulfuric acid, acetic acid, citric acid, sulfonic acid, etc. Although the amount of acid to be added is not specifically limited, the acid amount is preferably 0.001 to 2 in molar ratio to the organic silicon compound. When the amount of the added acid is less than 0.001 in molar ratio, acceleration of hydrolysis of organic silicon compound is not sufficient. In case the amount is larger than 2 in molar ratio, the effect of improvement of hydrolysis is no longer improved, and it is undesirable.

The amount of water to be added which is necessary for the hydrolysis of the above organic silicon compound is preferably 0.1 to 100 based on the organic silicon compound in molar ratio. When the water addition amount is less than 0.1 in molar ratio, the acceleration of hydrolysis of the organic silicon compound is insufficient, and when the water is larger than 100 in molar ratio, a tendency of lowering in stability of liquid manifests and is undesirable.

In case of using the above chlorosilyl group-containing compound, addition of water or acid is not essentially necessary. Even in case of no additional incorporation of water or acid at all, hydrolysis progresses by the water contained in the solvent or by the water in the atmosphere. Further, along with this hydrolysis, hydrochloric acid is isolated in the liquid and hydrolysis further progresses. However, additional incorporation of water or acid is quite acceptable.

The above chain silica fine particles, organic silicon compound, chlorosilyl group-containing compound, or their hydrolyzates are mixed with solvent, and according to necessity, water, acid catalyst, and dispersing auxiliary are added to prepare a coating solution for forming dents and projections on the substrate. At this time, the organic metal compound and the chlorosilyl group-containing compound may be used either solely or in mixture. Preferred material mixing ratio of this coating solution is as shown in the following Table 1. In the table, the silicon compound represents the total of the above organic silicon compound, chlorosilyl group-containing compound, or their hydrolyzates.

TABLE 1

| Silicon compound | 100 parts by weight |
| --- | --- |
| Chain form silica fine particles | 100~800 parts by weight |
| Water | 4~150 parts by weight |
| Acid catalyst | 0.00001~5 parts by weight |
| Dispersing auxiliary | 0.001~10 parts by weight |
| Solvent | 500~10000 parts by weight |

The above organic metal compound or chlorosilyl group-containing compound is dissolved in a solvent, to which a catalyst and water are added, and the mixture is subjected to hydrolysis at a predetermined temperature between 10° C. and the boiling point of the solution for 5 minutes to 2 days. To the resultant product the chain silica fine particles and if necessary a dispersion auxiliary are added, and further if necessary reaction is made at a predetermined temperature between 10° C. and the boiling point of the solution for 5 minutes to 2 days to give a coating solution. In case of using a chlorosilyl group-containing compound, the catalyst and water need not specifically be added. The chain silica fine particles may be added prior to the above hydrolysis process. Further, in order to omit the hydrolysis process of the organic silicon compound, the above commercialized organic metal compound hydrolyzate solution may be used. The resulting coating solution may be subsequently diluted with an appropriate solvent according to the coating method.

The above coating solution is applied to the glass substrate, dried, and a silica dent and projection film is formed on the glass substrate.

The application method may be the known one and is not specifically limited. The method includes the ones using the apparatus such as spin coater, roll coater, spray coater, curtain coaer, etc., immersing (dip coating) method, flow coating method, etc., and various printing methods of screen printing, gravure printing, curved surface printing, etc.

Depending on the glass substrate, uniform coating may not be made due to the repelling of the above coating solution. This however can be corrected by washing the substrate surface or surface reformation. The methods of washing or surface reformation include de-oiling washing by the organic solvent such as alcohol, acetone, hexane, etc., washing by alkali or acid, method of polishing the surface by abrasives, supersonic washing, UV irradiation treatment, UV ozone treatment, plasma treatment, etc.

On the glass substrate after application, a silica dent and projection film is formed by drying at a temperature in the range of room temperature to 200° C. for 1 minute to 2 hours. According to necessity, heat treatment may be given at a temperature between 400° C. and 750° C. for 5 seconds to 5 hours, by which the silica dent and projection film on the surface of the glass substrate becomes strong. This dent and projection film comprises a matrix of silica fine particles and silica (derived from organic metal compound), wherein the chain silica fine particles are fixed to the glass substrate by the silica matrix, and the surface configuration of the chain silica fine particles forms the dents and projections of the film.

The glass substrate before the above application may be the glass plate for wind shield, rear window, front door, or rear door, etc. for an automobile after completion of the bending process and joining process, or the glass plate before the laminating process, or before the bending process, or before cutting into the predetermined size.

The glass plate for an automobile coated with silica dent and projection film can further be coated thereon with water-repellent film or anti-fogging film. By providing a water-repellent film, water-repellent performance is obtained, and in case of deposition of soil, soiling removal property can also be improved. Furthermore, by providing an anti-fogging water-proofing coating, anti-fogging performance is obtainable, and in case of deposition of soil, the soiling removing performance is also improved. Silica dent and projection film may be applied to both surfaces of the glass plate (laminated glass plate may be used) and water-repellent film may be applied to one or both surfaces, or a silica dent and projection film may be applied to the surface of one side of the glass plate and water-repellent film may be applied to both the silica dent and projection film and untreated glass surface or to either one of them. The performance of visible light projection and visibility may not be lowered though a silica dent and projection film is covered with water repellent film.

In the same manner, the invention may be so practiced that a silica dent and projection film is coated on both surfaces of the glass plate (this may be a laminated glass) and an anti-fogging film is coated on at least one surface, or a silica dent and projection film is coated on one side surface of the glass plate (this may be a laminated glass) and an anti-fogging film may be further coated on both sides or either one side of the silica dent and projection film or untreated glass surface.

In the case the invention is applied to windows for an automobile, it is preferable that the silica dent and projection film is coated on both side surfaces of the glass plate (this may be a laminated glass), an anti-fogging coating is provided on the film surface of one side (on the inside of the automobile), and a water-repellent coating is provided on the layer film surface (on the outside of automobile).

BEST MODE FOR CARRYING OUT THE INVENTION

Hereinafter, the present invention is illustrated with reference to the examples. It is to be understood that the invention is not to be limited thereby.

[First Embodiment]

There is provided a mixture of 3.0 parts by weight of hydrolytic condensation polymerization liquid of ethyl silicate (trade name: HAS-10 made by Colcoat Co., $SiO_2$ content: 10% by weight), 13.3 parts by weight of chain silica colloid (trade name: Snowtex OUP made by Nissan Chemical Industry Co., Ltd. solid content 15% by weight, containing dispersion auxiliary) having an average diameter of about 15 nm and average length of about 170 nm, and 74.9 parts by weight of 2-propanol at room temperature, which is diluted with threefold parts by weight of 2-propanol and stirred at room temperature for 2 hours to obtain a coating solution for forming low refractive index dents and projections layer. The coating solution contains the chain silica fine particles and ethyl silicate in a ratio by weight of 100:15 by conversion into silica, respectively. This coating solution also contains 670 parts by weight of the chain silica fine particles, 45 parts by weight of the water, 4.5 parts by weight of acid catalyst and solvent against 100 parts by weight of silicon compound.

A soda lime silicate glass plate (65 mm×150 mm×3 mm) which is surface polished with a cerium oxide type abrasive and washed, and further subjected to supersonic washing in pure water and dried, is immersed in a coating solution for forming the above low refractive index dents and projections layer, and pulling up at avelocity of 20 cm/min. to coat the coating solution on both surfaces of the glass plate. The resulting glass plate is dried at 100° C. for 30 minutes, and further subjected to heat treatment in an oven at 500° C. for 1 hour after drying at 250° C. for 30 minutes to obtain a glass plate having the silica dent and projection film of 140 nm in thickness formed on each surface. The film thickness of 140 nm approximately equals to the conditions in which the reflectivity becomes minimum at the time when the angle of incidence ($\alpha$) is 60 degrees, i.e., based on the refractive index of film (n)=1.340, the film thickness is approximately equal to the amount of 134 nm obtained by calculating the above equation 2 to the light having a wavelength of 550 nm ($\lambda$).

Measurements of the film thickness, film refractive index, film void ratio, film surface roughness, visible light reflectivity of the glass plate with silica dent and projection film, and visibility of the silica dent and projection film are carried out in the following manner.

Thickness of silica dent and projection film: The cross-section of the glass plate coated with silica dent and projection film is observed with an electron microscope in a magnification rate of 100,000 to determine the height from the surface of the glass plate to the summit of the projection part of the dents and projections film to be the film thickness.

Refractive index of film: The amount is obtained in the light having a wavelength of 550 nm with ellipsometer.

Film void ratio: The size of void is measured and calculated from the electron microphotograph.

Film surface roughness: The film is observed with an atomic force microscope (SPI3700 made by SEIKO Electronic Co., Ltd.) and the arithmetic average length (Ra Value) and mean interval of dents and projections (Sm value) are calculated from the measured sectional curve based on the amounts defined by the method of JIS B 0601 (1994).

Visible light reflectivity: The reflectivities of visible light (wavelength 380 to 780 nm) at the angle of incidence of 12 degrees and 60 degrees are measured on the reflected light from both sides of the glass plate with a spectrophotometer (MCPD-1000, made by Otsuka Electronic Co., Ltd.).

Visibility: There are attached the glass plate with silica dent and projection film on one side (right half) of the wind shield of an automobile and an untreated glass plate on the other side (left half), respectively, and by observing the ease with which the forward landscape may be seen from within the cabin of the automobile, i.e., the extent to which the forward field of vision is interrupted by reflections from the inner panel when viewed through the left and right glass plates. In this way a functional evaluation of the visibility parameter may be obtained. The judgment standards are obtained in 1 to 5 stages as shown in the following Table 2.

The results of measurement are shown in Table 3.

TABLE 2

Visibility functional evaluation standards

| Point | Standards |
|---|---|
| 1: | Reflection of inner panel attracts the attention and the front landscape is less easy to see. |
| 2: | Reflection of inner panel slightly attracts the attention but the front landscape is seen with attention. |
| 3: | There is slight reflection of inner panel, but the front landscape is easily observed. |
| 4: | There is scarce reflection of inner panel and the front landscape is approximately clearly seen. |
| 5: | There is no reflection of inner panel and the front landscape is clearly seen. |

First Comparison Example

Using a coating solution (containing silica fine particles and ethyl silicate in the ratio by weight of 100:15 by conversion to silica) made by using 10.0 parts by weight of silica colloid having a particle size of 50 nm (trade name: Snowtex OL, made by Nissan Chemical Industry Co., Ltd., solid content 20% by weight) in place of 13.3 parts by weight of the chain silica colloid of the coating solution used in First Embodiment, both side surfaces of the glass plate are dip coated, dried, and heat treated in the same manner as in First Embodiment to obtain a glass plate having the silica dent and projection films of thickness 118 nm formed on each surface. The film thickness of 118 nm approximately equals to the conditions in which the reflectivity becomes minimum at the time when the angle of incidence ($\alpha$) is 60 degrees, i.e., based on the refractive index of film (n)=1.454, and the film thickness is equal to the amount of 118 nm obtained by calculating the above equation 2 to the conditions for the optical film thickness becomes $4/\lambda$ to the light having a wavelength $\lambda$ of 550 nm. The thickness of silica dent and projection film, reflectivity of the film, void ratio of the film, the roughness of the surface of the film, reflectivity of the visible light of the glass plate with silica dent and projection film, and measurement results of the visibility are obtained as shown in the following table 3.

SECOND AND THIRD COMPARISON EXAMPLES

Except that the mixture of 3.0 parts by weight of hydrolytic condensation polymerization liquid of ethyl silicate of the coating solution used in First Embodiment is changed to 20 parts by weight, and the chain silica fine particles and ethyl silicate in the coating solution are changed to 50:50 in ratio by weight converted into silica, respectively, both side surfaces of the glass plate are dip coated, dried, and heat treated in the same manner as in First Embodiment to obtain a glass plate having the silica dent and projection film of thickness 120 nm formed on each surface (Second Comparison Example ). The film thickness of 120 nm approximately equals to the conditions in which the reflectivity becomes minimum at the time when the angle of incidence ($\alpha$) is 60 degrees, i.e., based on the refractive index of film (n)=1.432, and the film thickness is approximately equal to the amount of 121 nm obtained by calculating the above equation 2 to the conditions for the optical film thickness becomes $4/\lambda$ to the light having a wavelength $\lambda$ of 550 nm.

Further, except that the amount of use of the chain silica colloid in the coating solution is made zero, both side surfaces of the glass plate are dip coated, dried, and heat treated in the same manner as in First Embodiment to obtain a glass plate having the silica film of thickness 115 nm formed on each surface (Third Comparison Example ). The film thickness of 115 nm equals to the conditions in which the reflectivity becomes minimum at the time when the angle of incidence ($\alpha$) is 60 degrees, i.e., based on the refractive index of film (n)=1.473, and the film thickness is equal to the amount of 115 nm obtained by calculating the above equation 2 to the light having a wavelength $\lambda$ of 550 nm. The thickness of silica dent and projection film, reflectivity of the film, void ratio of the film, the roughness of the surface of the film, reflectivity of the visible light of the glass plate with silica dent and projection film, and measurement results of the visibility are obtained as shown in the following table 3.

The visible light reflectivities at the angle of incidence at 12 degrees and 60 degrees of the untreated glass plate (having refractive index of 1.5) are about 7% and about 14%, respectively.

TABLE 3

|  | First Embodiment | Comparison example 1 | Comparison example 2 | Comparison example 3 |
|---|---|---|---|---|
| Film thickness (nm) | 140 | 118 | 120 | 115 |
| Refractive index | 1.340 | 1.454 | 1.432 | 1.473 |

TABLE 3-continued

|  |  | First Embodiment | Comparison example 1 | Comparison example 2 | Comparison example 3 |
|---|---|---|---|---|---|
| Void ratio(Volume %) | | 60 | 15 | 2 | 0 |
| Surface roughness(nm) | Ra | 7 | 6 | 5 | 0 |
|  | Sm | 20 | 20 | — | — |
| Visible light reflectivity(%) | Incident angle 12(deg.) | 0.8 | 1.8 | 4 | 8 |
|  | Incident angle 60(deg.) | 1.9 | 4.3 | 8 | 14.5 |
| Visibility | | 5 | 4 | 3 | 1 |

[Second Embodiment]

In place of the soda lime silicate glass plate (65 mm×150 mm×3 mm) used in First Embodiment, a glass plate for an automobile wind shield having the same soda lime silicate glass composition (about 150 cm×about 60 cm×3 mm) is used, which is subjected to dip coating, drying, and heat treatment by known step for bending (heat for 15 minutes at 570° C.) in the same manner as in First Embodiment to produce a glass plate for an automobile wind shield having a silica dent and projection film of thickness 120 nm formed on each surface.

With respect to this glass plate, the dents and projection film thickness, film refractive index, film void ratio, film surface roughness, visible light reflectivity, and visibility are measured to obtain the same results as those of First Embodiment. And, as to the strength of the film, the following steps were done repeatedly; using a piece of cotton cloth to which the commercialized glass cleaner is applied, two ways rubbing is repeated 100 times while applying a load of 500 gf, and the film is observed with the unaided eye to examine abnormality or not. In First Embodiment, abnormality is shown after 300 times rubbing, but in Second Embodiment, no abnormality is exhibited up to 5000 times rubbing. The laminated glass plate for an automobile wind shield attached with polyvinylbutylal intermediate film of thickness 0.7 mm, after preparing 2 glass plates for an automobile wind shield with above silica dent and projection film and being through known step for laminating was obtained. This laminated glass showed almost the same results in visible light reflectivity and in visibility as First Embodiment.

[Third Embodiment]

In a 1 liter glass reactor equipped with a thermometer, stirrer, and cooler, 10.0 g of perfluoro group-containing organosilicon compound of the formula $C_8F_{17}CH_2CH_2Si(OCH_3)_3$, 10.0 g of hydrolytic group-containing methyl polysiloxane compound as shown in following chemical formula 1, 360.0 g of t-butanol, and 1.94 g of 0.1N hydrochloric acid are charged, and the mixture is subjected to co-hydrolysis reaction at 80° C. for 5 hours, and further, 160.0 g of n-hexane which is a hydrophobic solvent is added and stirring is made at room temperature for 10 hours.

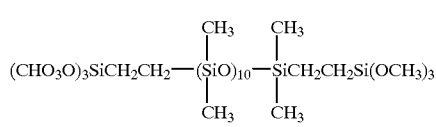

(1)

Next, 10.0 g of organopolysiloxane of the following chemical formula 2 and 5.0 g of methane sulfonic acid are added and the mixture is stirred for 10 minutes to obtain a water-repellent film forming composition.

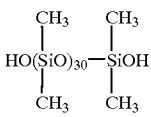

(2)

On one surface of the dents and projections layer of the silica dents and projections layer coated glass plate obtained in First Embodiment above, 0.1 ml of the above composition for forming water-repellent film is spread with a cotton cloth 10 times, surplus coating solution is wiped off with a dry cloth, after which the layer is subjected to heat treatment at 100° C. for 10 minutes to obtain a low reflective water-repellent glass plate containing water-repellent film of thickness 40 nm. Also, the quality of the appearance proved to be good after the water-repellent film was observed with naked eyes to examine abnormality or not.

The contact angle of the resulting water-repellent film with water is measured by measuring the contact angle of water drops of about 2 mm in diameter using the contact angle gauge ([CA-DT] made by Kyowa Kaimen Chemical Co., Ltd.) to practice the tests on wear resistance, chemical resistance, and weather resistance. Though the contact angle is low after being tested on weather resistance, every initial contact angle, contact angle of after experimental tests of wear resistance and contact angle of after chemical resistance were 95° or more. So the results are very excellent as shown in Table 4. And, with respect to the low reflective water-repellent glass plate, light is introduced from the surface opposite to the water-repellent film surface and the reflectivity of visible light is measured. Also, on measurement of the visibility with the water-repellent film surface directed outside the automobile, there are obtained entirely the same results of value on initial, after wear resistance test and after chemical resistance test respectively as those of First Embodiment.

In the above, the wear resistance test is performed by setting a dry cloth to the reciprocal wear tester made by Shinto Kagaku Co., Ltd., reciprocating the water-repellent film surface under a load of 0.3 kg/cm² for 3000 times, followed by measuring the contact angle; the chemical resistance test is performed by measuring the contact angle after immersed in saturated lime water for 24 hours; and weather resistance is measured by using a weather resistance tester "EYESUPER UV tester W13" (made by Iwasaki Denki) at the luminosity of 76±2 mW/m², black panel temperature at 48±2° C., and showering for 30 seconds every 1 hour to measure the contact angle after irradiation of ultraviolet ray for 400 hours.

TABLE 4

|  |  | Third Embodiment |
| --- | --- | --- |
| Water-repellent film | Film thickness (nm) | 40 |
|  | Appearance quality | Good |
| Initial contact angle (deg.) |  | 107 |
| Abrasion resistance (deg.) |  | 100 |
| Chemical resistance (deg.) |  | 101 |
| Weather resistance (deg.) |  | 85 |

[Fourth Embodiment]

To 1000 ml commercialized ethanol (99.5%), 1 ml of 0.1N acetic acid is added and the mixture is stirred. To 796 g of a liquid mainly comprising the ethanol, 4 g of [methoxy (polyetheleneoxy) propyl] trimethoxysilane ("SIM6492.7" made by Chisso K.K., content 90%, molecular weight 460 to 590, ethylene oxide unit 6 to 9) is added, which is stirred at 30° C. for 1 hour to prepare an organosilane coating solution.

The silica dents and projections layer coated glass plate obtained in First Embodiment is washed by supersonic wave in pure water, dried, and then immersed in the organosilane coating solution, after which the plate is pulled up at a speed of 5 cm/min. to apply the liquid to both side surfaces of the glass plate coated with silica dent and projection film. This glass plate is dried and heat treated at 120° C. for 30 minutes, then cooled to room temperature, and lightly washed with pure water to obtain a glass plate coated with anti-fogging silica dent and projection film on which an organosilane layer of about 8 nm in thickness is formed, containing polyethylene oxide group in a molecule.

According to this low reflectance anti-fogging glass plate, there are obtained exactly the same results as those of First Embodiment when visible light reflectance and visibility is measured by incoming light. With respect to this glass plate coated with anti-fogging silica dent and projection film, surface roughness measurement, contact angle measurement, initial and repeating anti-fogging property evaluation is performed by the method as shown hereunder. As to the results of these measurements, it is known that excellent anti-fogging characteristics are displayed as shown in Table 5, soil adsorption is less apt to occur, and favorable anti-fogging preservation characteristic and stain-preventing performance are held.

TABLE 5

| Sample |  | Fourth Embodiment |
| --- | --- | --- |
| Surface roughness (nm) | Ra | 6 |
|  | Sm | 20 |
| Initial state | Contact angle(deg.) | 3 |
|  | Fogging evaluation | ◉ |
|  | Distortion evaluation | ◉ |
| Repeating anti-fogging property | Fogging evaluation | 4 |
|  | Distortion evaluation | 5 |

Measurement of Surface Roughness and Contact Angle

As to the glass plate on which the above mentioned silica dent and projection film was formed, the arithmetical mean roughness (Ra) and mean interval (Sm) of dents and projections were obtained by using the same method used in the measurement of silica dent and projection film in First Embodiment. Furthermore, the contact angle with respect to a water drop of 0.4 mg was measured by using a contact angle gauge (Kyowa Kaimen Kagaku Co., Ltd., "CA-DT"). Smaller contact angle shows superiority in efficiency of anti-fogging.

Evaluation of Anti-fogging Property

After a glass plate having the abovementioned silica dent and projection film formed is placed in a constant-temperature humidistat chamber, the temperature and relative humidity of which respectively are 5° C. and 10%, for ten minutes, the same is transferred to a constant-temperature humidistat chamber, the temperature and relative humidity of which respectively are 25° C. and 70%, wherein the fogging was observed from the point when 30 seconds elapsed to the point when two minutes elapsed, and the distortion of penetration image after two minutes elapsed was observed, and minute water drop adhered state on the surface of the glass plate was investigated, wherein fogging evaluation and distortion evaluation were performed in compliance with the four-level evaluation standards shown in

TABLE 6

| Fogging evaluation | Fogging state |
| --- | --- |
| ◉ | Not fogged at all |
| ○ | Only slightly fogged |
| Δ | Slowly but thickly fogged |
| X | Thickly fogged soon |
| Distortion evaluation of penetration | Distorted state of penetration image |
| ◉ | Not distorted at all |
| ○ | Only slightly |
| Δ | Considerably distorted |
| X | Remarkably distorted |

Repeating Anti-fogging Property Evaluation

The abovementioned sample plate is placed on a cooling device (made of transparent plastic) regulated in JIS S 4030-1995 "Method for testing anti-fogging agents for glasses", wherein the rear side of the sample plate was brought into contact with cooling water, and the sample temperature was kept at 20° C. The sample plate cooled in this state was placed in a constant temperature humidistat chamber, the temperature and relative humidity of which are 45° C. and 80%, for three minutes. Thereafter, the sample plate was placed in a constant temperature humidistat chamber, the temperature and relative humidity (RH) of which are 20° C. and relative humidity is 10%, and was dried for three minutes. This operation consisting of being exposed to the high temperature atmosphere and being exposed to the low temperature atmosphere is regarded as one cycle. Thirty cycles were repeated.

After the repeated operation was over, a test chart for judging penetration distortion, which is printed on a plastic plate, was adhered to the rear side of the abovementioned cooling device, water was caused to soak into the clearance between the plate and the rear side of the cooling device, and the test chart for judging penetration distortion was observed from the sample side. The test chart for judging penetration distortion is made similar to a test chart shown in FIG. 1 attached to JIS S 4030-1995, wherein the length of the three white lines is 10 mm and the line width and interval of three lines are respectively 0.15 mm, 0.5 mm, 1.0 mm, 1.5 mm, and 2.0 mm to make five steps. The cooling water temperature of the cooling device to which the sample is attached was cooled down to 5° C., and the device was placed in a constant-temperature humidistat chamber, the temperature and relative humidity of which are 25° C. and 80%, wherein generation of fogging and penetration distortion was investigated by using the above mentioned test chart for judging penetration distortion, and the fogging evaluation and distortion evaluation of the repeating anti-fogging property were performed in compliance with 6-level evaluation standards shown In Table 7.

TABLE 7

| Fogging evaluation | Fogging state |
| --- | --- |
| 5 | Hardly fogged on the entire surface. |
| 4 | 80% or more area not fogged. |
| 3 | 60% or more area not fogged. |
| 2 | 60% or more area fogged. |
| 1 | 80% or more area fogged. |
| 0 | Almost fogged on the entire surface. |
| Distortion evaluation of penetration | Distorted state of penetration |
| 5 | Not distorted at all. |
| 4 | White lines having an interval of 0.15 mm cannot be recognized clearly. |
| 3 | White lines having an interval of 0.5 mm or less cannot be recognized clearly. |
| 2 | White lines having an interval of 1.0 mm or less cannot be recognized clearly. |
| 1 | White lines having an interval of 1.5 mm or less cannot be recognized clearly. |
| 0 | White lines having an interval of 2.0 mm or less cannot be recognized clearly. |

[Fifth Embodiment]

Two sheets of glass plate for an automobile wind shield on each surface of which a silica dent and projection film having a thickness of 120 nm obtained in Second Embodiment is formed, sandwiching therebetween a polyvinyl butyral film having a thickness of about 0.5 mm, are subjected to vacuum press-fixing in an autoclave at about 140 to 150° C. to obtain a laminated glass plate. On the cabin side surface of the laminated glass plate, gravure coating is provided with the liquid made by an organosilane coating solution obtained in Fourth Embodiment with incorporation of an appropriate amount of viscosity adjusting agent, after which the processed object is subjected to dry heat treatment at 120° C., for 30 minutes, cooled to room temperature, and then lightly washed with pure water to coat the organosilane anti-fogging layer containing polyethylene oxide group in the molecule with the thickness of about 8 nm inside.

Next, on the outside surface of the cabin of the glass plate, 1.0 ml of the water repellent film forming composition prepared in Third Embodiment is applied with a cotton cloth for spreading for 10 times, and the surplus coating solution is wiped off with a dry cloth, after which the glass plate is subjected to heat treatment at 100° C., for 10 minutes to provide the cabin outside surface with low reflective water-repellent property.

By the above step, there is obtained a glass plate for an automobile wind shield made by laminating in order from the outside of the car water-repellent coating—silica dent and projection film—glass plate—silica dent and projection film—polyvinyl butyral film—silica dent and projection film—glass plate—silica dent and projection film—anti-fogging film.

On measurement of the anti-fogging performance of the glass plate on the cabin inside surface and the water-repellent performance on the outside surface of the automobile, it is known that the coating has good anti-fogging performance equivalent to that of the result of measurement in Fourth Embodiment and good water-repellent property equivalent to that of the result of measurement in Third Embodiment, respectively. And, on measurement of the visible light reflectivity by introducing light from the anti-fogging film surface of the glass plate and on determination of the visibility with the water-repellent film surface faced outside the automobile, there are obtained entirely the same results as those of First Embodiment in both the visible light reflectivity and visibility.

As the refractive index of the above polyvinyl butyral film is approximately equal to that of the glass plate, there is scarce change in the reflection prevention performance depending on the provision or not of the silica dent and projection film on the inside of the glass plate (on the side in contact with the polyvinyl butyral film).

[Sixth and Seventh Embodiments]

The coating solution was prepared using the same procedure as First Embodiment except for the proportion of the combination of hydrolytic condensation polymerization liquid of ethyl silicate, the chain silica colloid (Trade name: Snowtex OUP), and the 2-propanol are been changed as shown in table 8. This coating solution contained the chain silica fine particles and ethyl silicate in the ratio by weight converted into silica, respectively, as shown in table 8.

Next, using this coating solution, a glass plate on which silica dent and projection film were formed on both sides was obtained after being dip coated, dried, and heat treated in the same manner as in First Embodiment. Film thickness, refractive index, void ratio, surface roughness, visible light reflectivity of a glass plate on which silica dent and projection film being formed and visibility, which were measured in the same manner as First Embodiment, are shown in Table 9.

TABLE 8

|  | First Embodiment | Sixth Embodiment | Seventh Embodiment |
| --- | --- | --- | --- |
| Ethyl silicate hydrolytic condensation polymerization liquid (parts by weight) | 3.0 | 1.4 | 5.0 |
| Chain silica Colloid (parts by weight) | 13.3 | 13.3 | 13.3 |
| 2-Propanol (parts by weight) | 74.9 | 74.9 | 74.9 |
| Chain fine particles: Ethyl silicate (the ratio by weight converted into silica | 100:15 | 100:7 | 100:25 |

TABLE 9

|  |  | Sixth Embodiment | Seventh Embodiment |
| --- | --- | --- | --- |
| Film thickness (nm) |  | 115 | 160 |
| Refractive index |  | 1.28 | 1.38 |
| Void ratio(Volume %) |  | 70 | 55 |
| Surface roughness (nm) | Ra | 10 | 7 |
|  | Sm | 22 | 20 |
| Visible light reflectivity(%) | Incident angle 12(deg.) | 0.7 | 2.2 |
|  | Incident angle 60(deg.) | 1.9 | 3.2 |
| Visibility |  | 5 | 5 |

Industrial Applicability

According to the present invention, because the glass plate is provided with surface dents and projections and the coating layer has a low refractive index, the visible light reflectivity of glass plate, especially the visible light reflectivity (in the case the both sides are coated) at high incident angle of 60 degrees becomes as small as 4% or less, and in addition anti-dazzling effect is obtainable by surface dents and projections. Accordingly, it is possible to obtain a glass plate suitable for windows of an automobile having excellent visibility.

What is claimed is:

1. A visible light reflection preventing glass plate, said glass plate comprising a glass substrate and a film having an outer surface, said film (i) being coated on at least one side of said glass substrate, (ii) including chain silica particles having an average diameter of 10 to 20 nm and an average length of 60 to 200 nm and silica of 5 to 30% by weight based on the weight of the chain silica particles, (iii) having a thickness of 110 to 250 nm, and (iv) defining dents and projections on said outer surface.

2. The visible light reflection preventing plate as recited in claim 1, wherein the dents and projections on the film surface together have an arithmetic mean roughness (Ra) of 5 to 50 nm and a mean interval (Sm) of dents and projections of 10 to 300 nm.

3. The visible light reflection preventing glass plate as recited in claim 1, wherein the surface of the film and/or the surface of the glass substrate not coated with the film is further provided with water repellent coating.

4. The visible light reflection preventing glass plate of claim 1, wherein the surface of the film and/or the surface of the glass substrate not coated with the film is further provided with anti-fogging coating.

5. The visible light reflection preventing glass plate as recited in claim 1, where the glass substrate is coated with the film on both sides, the surface of the film located on one side of said substrate is further coated with anti-fogging film, and the surface of the film on the other side of the substrate is coated with water repellent.

6. The visible light reflection preventing glass plate of claim 1, wherein one surface of the glass substrate is coated with the film, an anti-fogging coating is provided on the outer surface of the film, and a water repellent coating is provided on the opposite surface of the glass substrate.

7. A visible light reflection preventing glass plate comprising a film having an outwardly facing surface coated on at least one side of a glass substrate, said film including chain silica fine particles having an average diameter of 10 to 20 nm and an average length of 60 to 200 nm and silica, having a thickness of 110 to 250 nm and defining empty space between mutually adjacent chain silica fine particles whereby said film has a refractive index of 1.25 to 1.40, and wherein dents and projections are formed on said outer surface of said film.

8. The visible light reflection preventing glass plate as recited in claim 7, wherein the dents and projections on the film surface together have an arithmetic mean roughness (Ra) of 5 to 50 nm and a mean interval (Sm) of dents and projections of 10 to 300 nm.

* * * * *